Nov. 2, 1948.    J. T. GRAFFIN    2,453,010
DOG COLLAR
Filed April 25, 1946
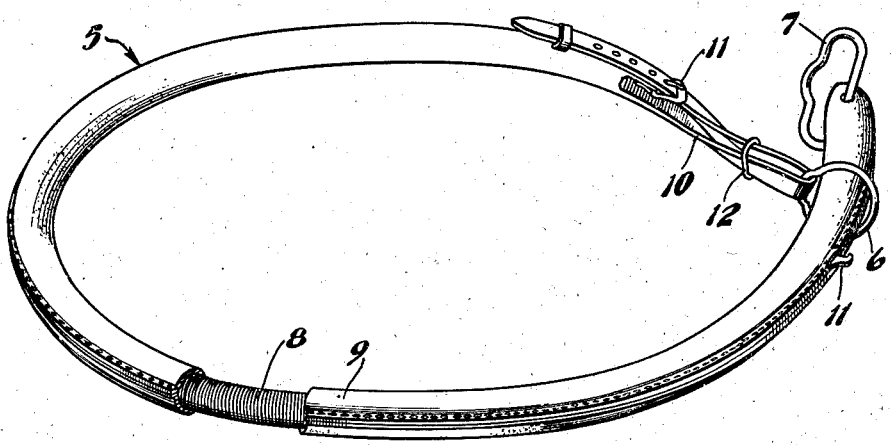
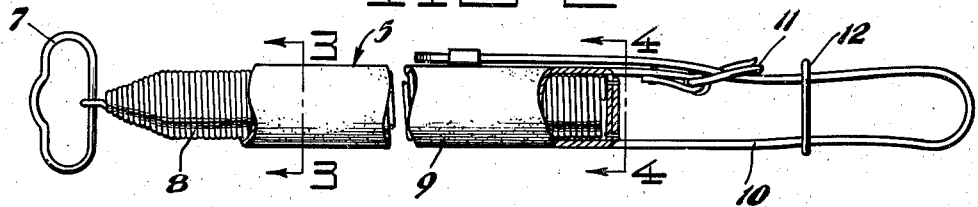
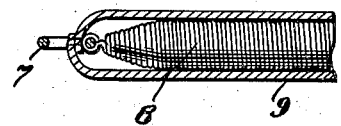  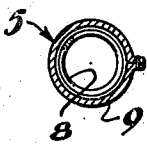  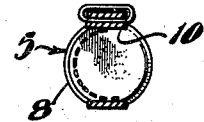
Inventor
*John T. Graffin*
By *Clarence A. O'Brien
and Harvey B. Jacobson*
Attorneys Patented Nov. 2, 1948

2,453,010

UNITED STATES PATENT OFFICE 2,453,010

DOG COLLAR

John T. Graffin, Lima, Peru

Application April 25, 1946, Serial No. 664,862

2 Claims. (Cl. 119—109)

This invention relates to an improved dog collar of the so called "choker" type, wherein the collar is contracted in response to a lunge on the part of the dog so as to apply a choking pressure upon the dog's neck and thereby make it possible to more readily and surely manage the dog.

The primary object of the present invention is to provide an improved dog collar of the above kind which is comparatively simple and durable in construction, efficient in use, and economical to manufacture.

A further object of the invention is to provide a dog collar of the above kind, wherein means is provided to prevent application of excessive choking pressure on the dog's neck, and wherein the choking pressure is automatically and quickly relieved when slack is provided in the leash connected to the collar.

Still another object of the invention is to provide a dog collar of the above kind which is adjustable as to effective size so as to be readily adaptable to dogs having necks of different sizes.

Yet another object of the present invention is to provide a dog collar of the above kind which is comfortable to wear as long as the dog exerts no pull upon the leash connected with the collar.

The exact nature of the present invention, as well as specific objects and features thereof, will become apparent from the following description when considered in connection with the accompanying drawing, in which:

Figure 1 is a perspective view, partly broken away, of a dog collar constructed in accordance with the present invention.

Figure 2 is an enlarged view, partly broken away, and in section, showing the end portions of the collar illustrated in Figure 1 and parts attached thereto.

Figure 3 is a transverse section taken on line 3—3 of Figure 2.

Figure 4 is a transverse section taken on line 4—4 of Figure 2.

Figure 5 is a view similar to Figure 3, showing a modification.

Figure 6 is a fragmentary longitudinal sectional view through the leash attaching end of the collar.

Referring in detail to the drawing, the present dog collar includes an elongated substantially C-shaped resilient neck-encircling member 5. An eye member 6 is connected to one end of the neck-encircling member 5 and has the other end portion of said member 5 slidably extended therethrough. A second eye member 7 is attached to the other end of the neck-encircling member 5 for connection with a leash. The neck-encircling member 5 is normally tensioned to expand to a condition wherein the same loosely encircles the dog's neck and has no choking pressure thereon. However, in case the dog should suddenly lunge forwardly, the leash connected to the eye member 7 will cause the associated end portion of the member 5 to slide through the eye member 6 so that the neck-encircling member 5 is contracted and has a choking effect upon the dog's neck. In this way, it is easy to manage the dog when aroused or when lunging forwardly suddenly for any reason. At the same time, as soon as the dog becomes quieted and the person leading the dog provides slack in the leash connected to the eye member 7, the neck-encircling member 5 will return to its normal expanded condition so as to relieve the pressure.

As shown, the neck-encircling member 5 preferably consists of a light and weak helical spring 8 having contiguous or closely related convolutions, and a tubular sheath 9 enclosing the spring 8 and preferably constructed of leather or like material so that the collar may be comfortably worn with the spring 8 held out of actual contact with the dog's neck. The spring 8 also has limited resiliency transversely thereof so as to give the neck-encircling member 5 a cushioning effect. The eye member 7 is preferably connected to an end of the spring 8, while eye member 6 is connected to opposite end of the neck-encircling member 5 by means of an adjustable strap 10 which is extended therethrough. One end of strap 10 is attached to the associated end of member 5, and the other end of said strap 10 is adjustably connected to the same end of the member 5 by means of a buckle 11. In this way, the effective length of the strap 10 may be varied so as to vary the overall size of the collar and thereby adapt the latter for use in connection with dogs having necks of different sizes. The strands of the belt 10 between the member 5 and the eye 6 is preferably encircled by a loose ring or loop 12 which prevents spreading of said strands.

In order to prevent excessive contraction of the collar, the neck-encircling member 5 is provided near the end to which the eye member 7 is attached, with an outwardly projecting stop member or lug 11. This lug or stop member 11 is located inwardly of the eye member 6 and thereby limits movement of the end of member 5 through the eye member 6 so as to limit contraction of the collar. By thus limiting the choking pressure applied to the dog's neck, excessive pressure on the dog's neck and harmful choking of the dog may be avoided or prevented.

The spring 8 may be made in different forms and need not be provided with circular convolutions as shown in Figures 1 to 3 inclusive. For instance, the convolutions of the spring may be made so as to provide a neck-encircling member of somewhat flat cross section as illustrated in Figure 5. In the latter figure, the spring 8' has rectangular convolutions and the spring is covered by a sheath 9' of similar cross sectional shape. In this way, the collar provides a relatively wide flat inner surface for contact with the dog's neck, and the overall thickness of the collar may be made relatively small.

From the foregoing description, it is believed that the construction, operation and advantages of the present invention will be readily understood and appreciated by those skilled in the art. Minor changes are contemplated such as fall within the scope of the invention as claimed.

What I claim is:

1. A dog collar including an elongated substantially C-shaped resilient neck-encircling member, an eye member connected to one end of said neck-encircling member and through which the other end portion of said neck-encircling member slidably extends, and a second eye member attached to the other end of said neck-encircling member for connection with a leash, said neck-encircling member comprising an elongated helical spring having the second named eye member directly attached to one end thereof, and a flexible sheath closed at said ends and completely enclosing said spring.

2. A dog collar including an elongated substantially C-shaped resilient neck-encircling member, an eye member connected to one end of said neck-encircling member and through which the other end portion of said neck-encircling member slidably extends, a second eye member directly attached to the other end of said neck-encircling member for connection with a leash, and an adjustable strap connecting the first named eye member to the first named end of said neck-encircling member for adjusting the effective size of the collar, said neck encircling member comprising an elongated helical spring having the second named eye member directly attached to one end thereof, and a flexible sheath closed at its ends and completely enclosing said spring.

JOHN T. GRAFFIN.

REFERENCES CITED

The following references are of record in the file of this patent:

UNITED STATES PATENTS

| Number | Name | Date |
|---|---|---|
| 64,362 | Reed | Apr. 30, 1867 |
| 205,515 | Von Culin | July 2, 1878 |
| 1,624,003 | Malin | Apr. 12, 1927 |

FOREIGN PATENTS

| Number | Country | Date |
|---|---|---|
| 384,432 | Germany | Nov. 11, 1923 |